Figure 1:
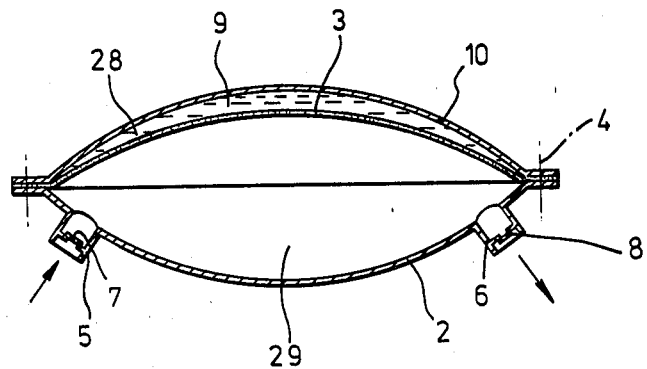

United States Patent [19]

Elo et al.

[11] 4,390,325

[45] Jun. 28, 1983

[54] PUMP DRIVEN BY THE RADIATION ENERGY OF THE SUN

[75] Inventors: Ari Elo, Turku; Jorma Poikonen, Raisio, both of Finland

[73] Assignee: Elomatic Oy, Turku, Finland

[21] Appl. No.: 147,733

[22] Filed: May 8, 1980

[30] Foreign Application Priority Data

Nov. 13, 1978 [FI] Finland ............................. 783447

[51] Int. Cl.³ ............................................. F04B 17/00
[52] U.S. Cl. ..................................... 417/379; 60/531; 417/395
[58] Field of Search ............... 417/379, 395, 377, 382; 60/641.8, 530, 531

[56] References Cited

U.S. PATENT DOCUMENTS

| | | | |
|---|---|---|---|
| 684,379 | 10/1901 | Rayner | 417/379 |
| 776,106 | 11/1904 | Beurrier | 417/379 X |
| 2,688,923 | 9/1954 | Bonaventura et al. | 417/395 X |
| 3,194,228 | 7/1965 | Barques | 126/447 |
| 3,309,012 | 3/1967 | Booth et al. | 417/394 X |
| 4,177,019 | 12/1979 | Chadwick | 417/379 |
| 4,197,060 | 4/1980 | Chadwick | 60/531 X |
| 4,265,600 | 5/1981 | Mandroian | 417/379 |

FOREIGN PATENT DOCUMENTS 2600882 7/1977 Fed. Rep. of Germany .
2357762 2/1978 France .................................. 417/379
566956 2/1975 U.S.S.R. ............................... 417/379

OTHER PUBLICATIONS

Helsingin Sandmat, Apr. 5, 1977.
Ingenioren 28/78, Jul. 1978, p. 5.

Primary Examiner—Edward K. Look
Attorney, Agent, or Firm—Woodling, Krost & Rust

[57] ABSTRACT

A pump driven by the radiation energy of the sun, wherein the radiation energy is converted into mechanical energy by means of a liquid evaporated by the effect of the radiation heat. The pump has a face that absorbs radiation and a casing part whose inside space is divided into two parts by means of a flexible and elastic membrane that can be moved back and forth. One of the parts constitutes the intake space into which the liquid to be pumped is sucked during the intake phase while the membrane moves so that the intake space becomes larger. The intake space is connected to an intake opening provided with a valve, which valve permits flow only into the intake space, and to an exhaust opening provided with another valve, which other valve permits flow only out of the intake space. A tightly sealed evaporation space, which contains evaporable liquid, is placed between the casing and the membrane against the membrane, whereby the vapor pressure of the evaporable liquid directly moves the membrane.

4 Claims, 15 Drawing Figures

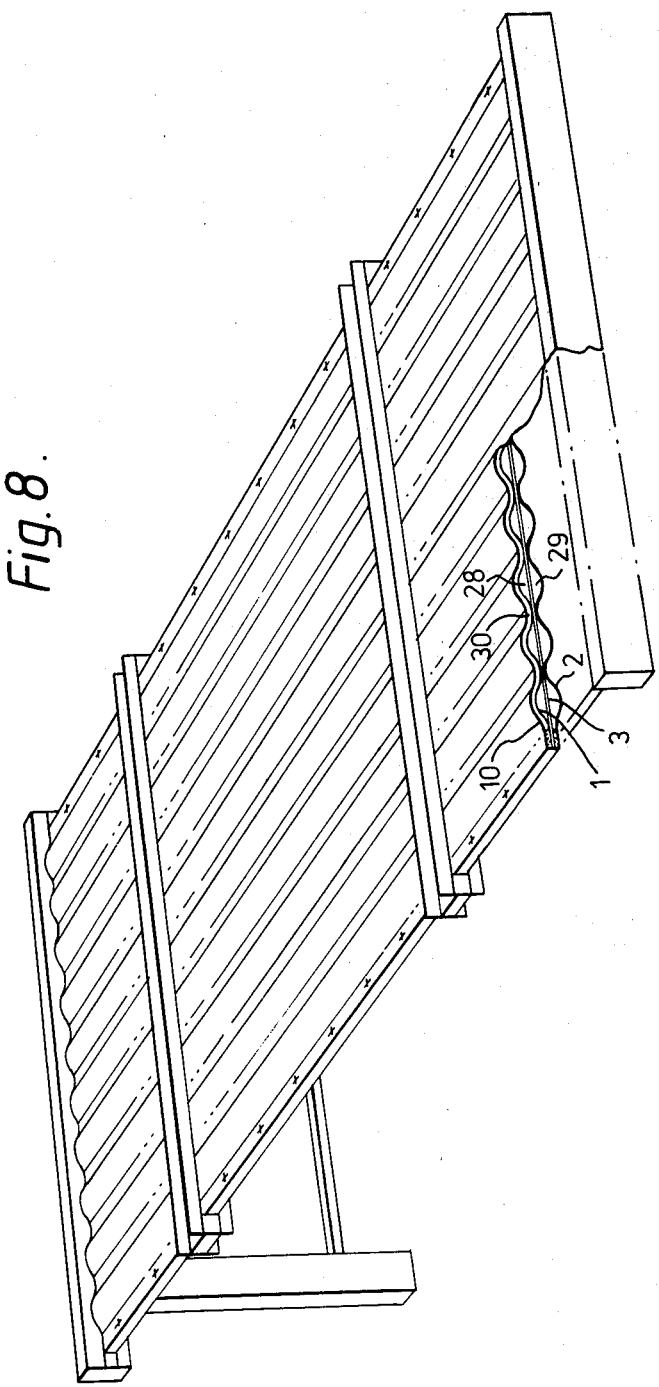

PUMP DRIVEN BY THE RADIATION ENERGY OF THE SUN

The subject of the present invention is a pump driven by the radiation energy of the sun, wherein the radiation energy is converted into mechanical energy by means of a liquid evaporated by the effect of the radiation heat and which pump has a face that absorbs radiation and a casing part whose inside space is divided into two parts by means of a flexible and elastic membrane that can be moved back and forth, one of which parts constitutes the intake space, into which the liquid to be pumped is sucked during the intake phase while the membrane moves so that the intake space becomes larger and which intake space is connected to an intake opening provided with a valve, which valve permits flow only into the intake space, and to an exhaust opening provided with another valve, which other valve permits flow only out of the intake space.

Pumping arrangements operating by means of solar energy are previously known in which the solar energy is first converted into electricity, which further drives a normal pump. On the other hand, pumps are known in which the vapour produces the movement operating the pump by means of a piston; the generation of vapour may in such a case also be accomplished by heating by radiation of the sun. An apparatus is also known in which a piston movable by means of vapour pushes a liquid underneath the piston, the flow of said liquid bulging the membrane in the system. The back and forth movement of the membrane produces suction of water from the well. A drawback of the above solutions is the complicated and expensive construction of the apparatuses.

The pump in accordance with the invention is characterized in that a tightly sealed evaporation space, which contains evaporable liquid, is placed between the casing and the membrane against the membrane, whereby the vapour pressure of the evaporable liquid directly moves the membrane. According to an embodiment, the outer cover of the device is transparent in respect of the space containing the evaporable liquid so as to permit entrance of solar radiation and, on the one hand, the surface and colour of the elastic membrane that divides the device into two spaces is such that it receives radiation well, and, on the other hand, the membrane is heat-insulating.

An advantage as compared with the known solutions is the simple construction and, consequently, low production costs of the apparatus.

Figure 2:
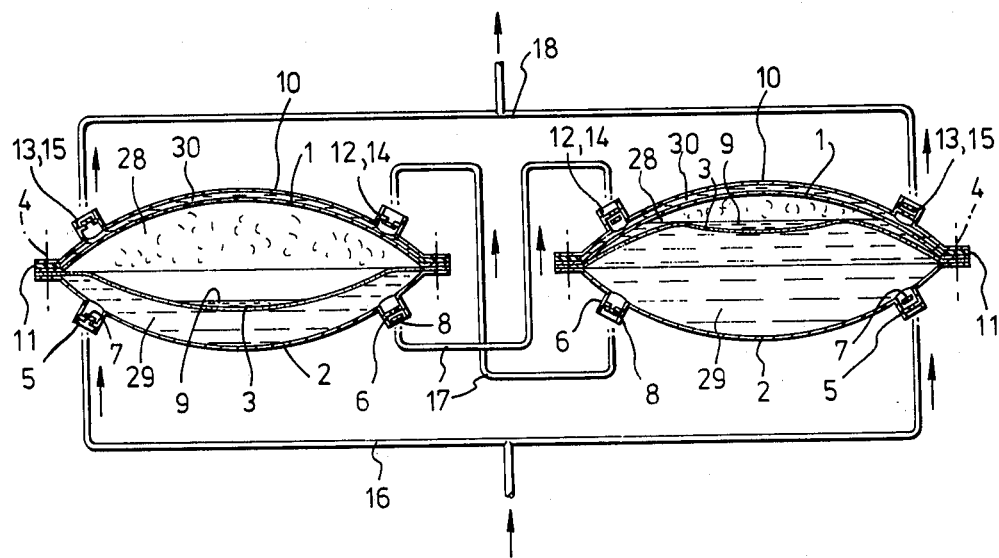
Figure 3:
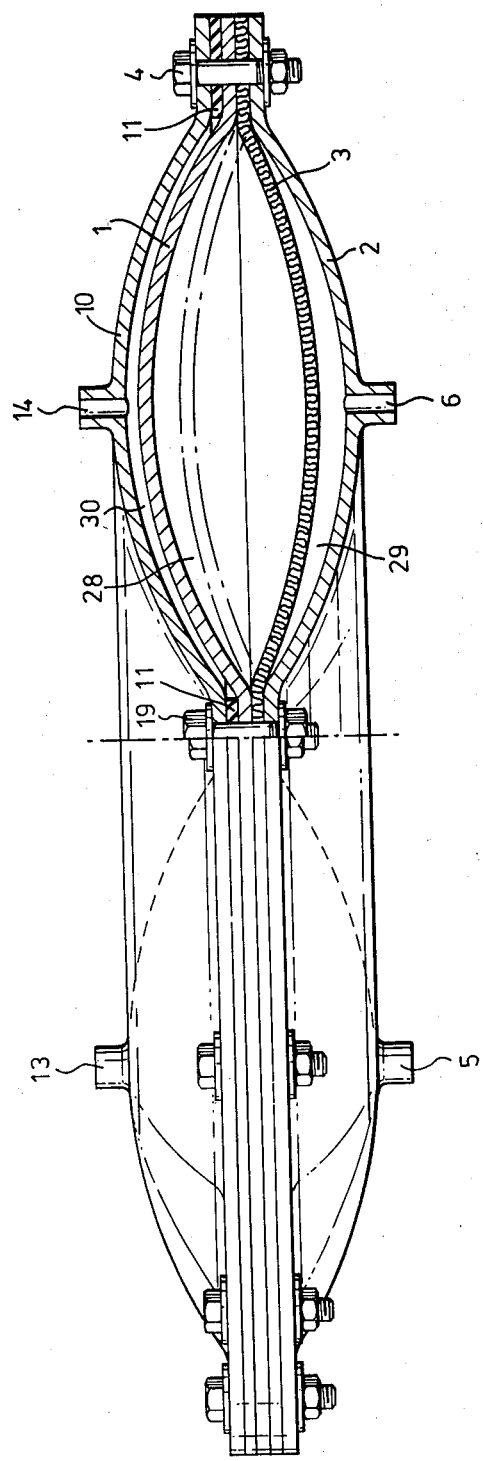
Figure 6:
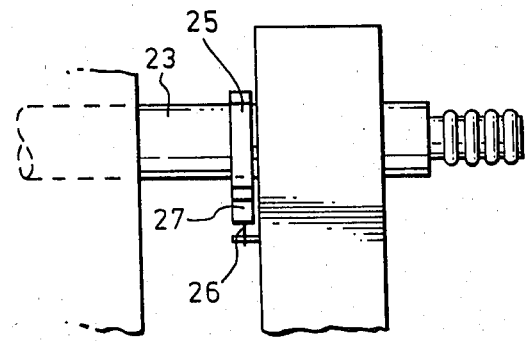
Figure 7:
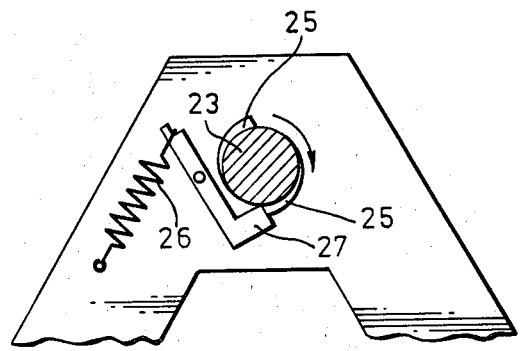
Figure 4:
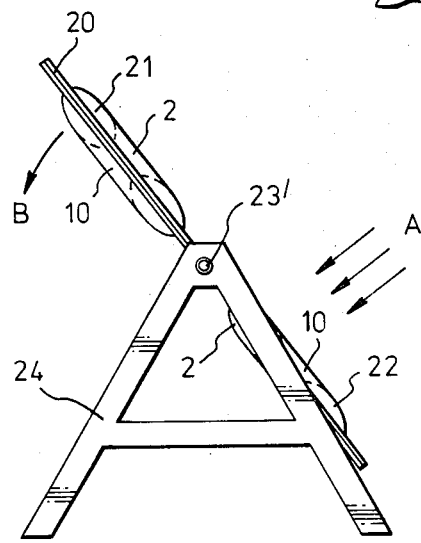
Figure 5:
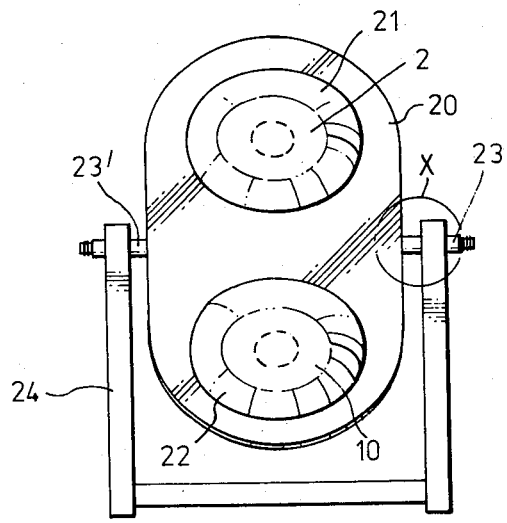
Figure 11:
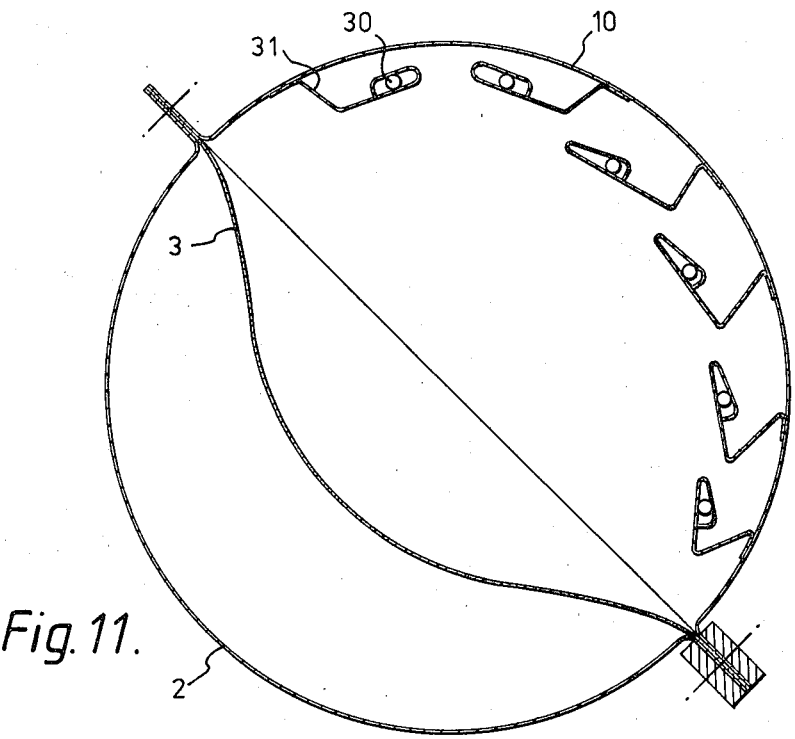
Figure 9:
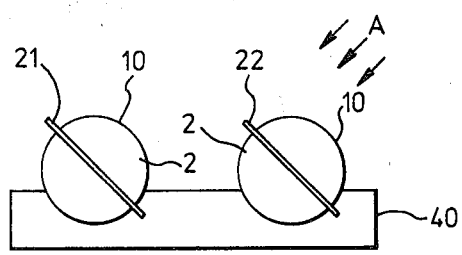
Figure 10:
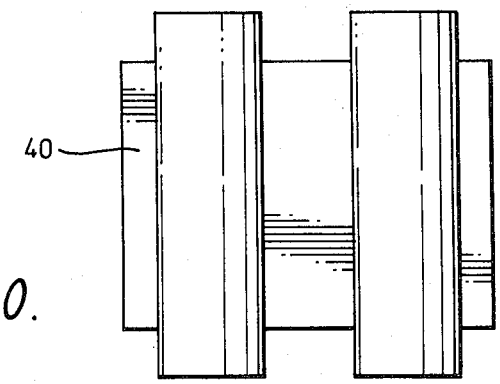
Figure 12:
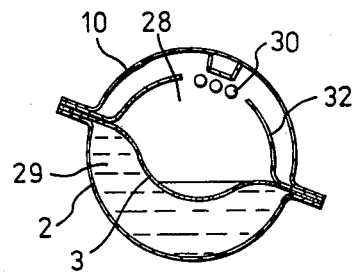
Figure 13:
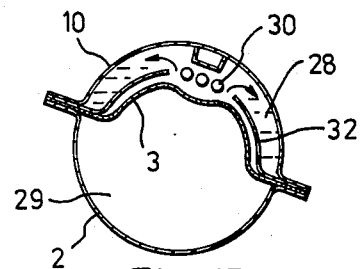
Figure 14:
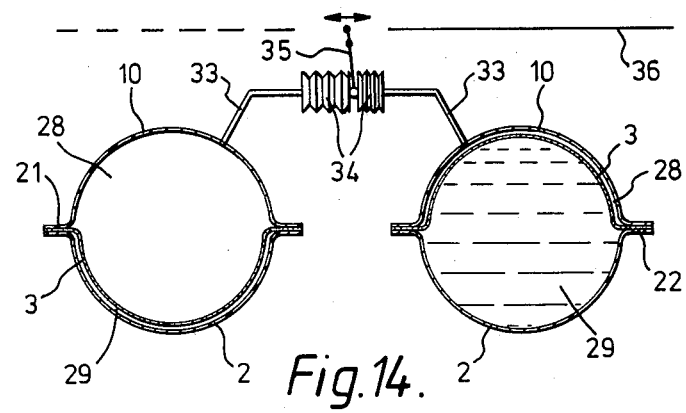
Figure 15:
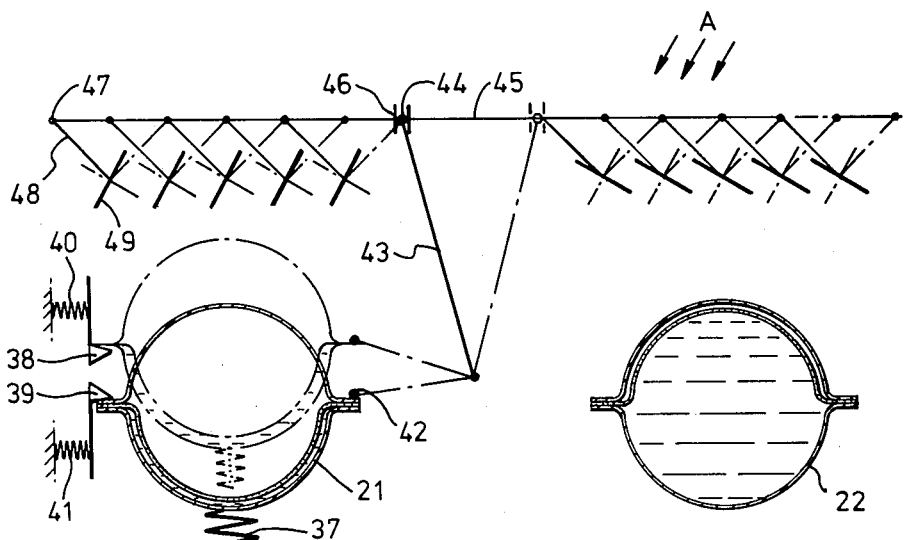

The invention will be described in more detail below with reference to the attached figures, wherein FIG. 1 is a sectional side view of one embodiment of the pump in accordance with the invention, FIG. 2 is a schematical sectional side view of a pump in accordance with the invention in which two units in accordance with FIG. 1 have been joined together, FIG. 3 is a side view of another embodiment of a pump in accordance with the invention partly in section, FIG. 4 is a side view of a pump in which two units in accordance with FIG. 3 have been joined together and fitted into a support frame, FIG. 5 is a front view of the pump shown in FIG. 4, FIG. 6 is an enlarged-scale view of detail X in FIG. 5, FIG. 7 is a side view of the detail shown in FIG. 6, FIG. 8 is a perspective view of a further embodiment of the invention, FIG. 9 is an end view of an embodiment of the invention, FIG. 10 is a view of the pump of FIG. 9 as viewed from the top, FIG. 11 is a sectional view of one of the units of the pump shown in FIGS. 9 and 10 on an enlarged scale, FIG. 12 shows a solution alternative to that shown in FIG. 11, FIG. 13 shows the unit of FIG. 12 in the second phase, FIG. 14 is a schematical view of a solution for shifting the shade used in the pump, and FIG. 15 is a schematical view of an alternative for shifting the shade.

FIG. 1 shows a pump unit which consists of a transparent upper part 10 of the outer casing, a lower part 2 of the casing, and a membrane 3, which are connected to each other by means of fastening means 4. The lower part 2 of the casing is connected to an intake opening and a pressure opening 6 with valves 7 and 8 of the back-stop type in these openings. In the space 28 between the casing 10 and the membrane 3 there is liquid 9. The pump operates as follows: The intake opening 5 is by means of a pipe connected to the medium to be pumped, and the pressure opening is connected to the object of use. Through the casing 10, the sun heats the membrane, which absorbs radiation to a high extent, whereby a considerable proportion of the radiation is recovered in the form of heating of the membrane surface. From the surface of the membrane the heat is transferred into the liquid 9, which starts evaporating. The evaporation goes on until the membrane has been pressed down against the casing 2. When the membrane 3 goes down, it empties the space 29 between the membrane and the casing 2 through the exhaust opening 6 and the valve 8, while the valve 7 in the intake opening 5 is closed. In the night-time the outer air cools the evaporated liquid 9 through the casing 10 and the vapour starts condensing into liquid. Then the membrane 3 starts rising and, when rising, sucks the medium to be pumped through the opening 5 and the valve 7 into the lower space 29. The membrane goes on rising until all the liquid 9 has again been condensed. The valve 8 of the pressure opening 6 remains closed by the effect of the suction. As the cooling required by the pump takes place during the night. The time of the cycle of operation is 24 hours.

FIG. 2 shows an embodiment in which the units have been joined together in pairs and supplemented with the following components: Transparent casting 1 and seal 11, intake opening 12, exhaust opening 13, valves 14 and 15, suction pipe 16 connecting the intake openings, intermediate pipes 17, and pipe 18 connecting the pressure openings. The casing 10 has the shape of a ball segment and it is fitted above the upper part 1 of the casing, at a distance from same. The space between the outer upper casing 10 and the inner upper casing 1 is sealed by means of a seal 11. The outer upper casing has an intake opening 12 provided with a valve 14 and an exhaust opening 13 provided with a valve 15.

The intake pipe 16 passes to the intake openings 5 of both units. The pressure opening 6 of each unit is connected to the intake opening 12 of the other unit by means of intermediate pipes 17. The exhaust openings of both units are connected to the exhaust pipe 18.

In this embodiment the operation of each pumping unit 21 and 22 takes place in principle in the same way as in an individual unit. The radiation of the sun passes through transparent casings 10 and 1 to heat membrane 3 and the liquid thereon. As the liquid evaporates the membrane 3 is pressed downwards towards the casing 2, forcing the medium being pumped through the exhaust opening of the unit. The difference is that instead of relying on the cooling of the night to condense the liquid, the medium pumped by one pumping unit cools the liquid of the other; the water pumped by one unit passes through the pressure opening 6 of the unit concerned into the space 30 between the upper casing 10 and the casing 1 of the other unit while performing cooling, whereby the suction phase occurs in this unit at the same time as the other unit is in the pressure phase. The pair of pumps can therefore operate relatively continuously at a rate depending on the radiation power of the sun. The suction and pressure phases of the pumping units 21 and 22 follow each other so that when one unit is in the pressure phase, the other one is in the suction phase.

FIG. 3 shows a pump unit similar to a single pumping unit of FIG. 2 which is designed so that the centre parts of the upper and lower casings of the ball-segment shaped unit shown in FIG. 2 are pressed towards each other and the centre parts of the casings are fastened to each other by fastening means, e.g. bolt 19, whereby the spaces between the casings and the membrane are annular, the pumping units have a general doughnut shape—See FIGS. 4 and 5. In this way the unit can be made more rigid than the units shown in FIGS. 1 and 2. The valving 5, 6, 13 and 14 remains the same as in the units of FIG. 2. The pump unit of FIG. 3 operates similarly to the pump units of FIG. 2. The only difference is that the membrane 3 is supported in its center. This support reduces the relative motion of membrane 3.

FIGS. 4 and 5 show a construction in which two units 21 and 22 in accordance with FIG. 3 have been fastened to a frame plate 20. The device of these figures utilizes the relative shifting mass of the pumping units to increase the efficiency of the device by reorienting the pumping units so that they are alternately exposed to the radiation of the sun. (This is to be contrasted with the relatively simultaneous exposure of the device of FIG. 2.) The units 21 and 22 are fastened to the plate 20 so that the outer transparent casings 1 and 10 of one unit are on the same side of the plate as the lower casing 2 of the other unit. The plate 20 is mounted to the support frame 24 on shafts 23 and 23' so that the plate can rotate around its axis of rotation passing symmetrically between the units 21 and 22. One of the shafts 23 is provided with a ratchet wheel 25, which operates jointly with an arrester 27 loaded by a drawing spring 26. The units 21-22 are connected to each other by means of valves and conduits (not shown) in accordance with the principle of FIG. 2, compensating for the fact that in FIGS. 4 and 5 the pumping units face in opposing, not similar, directions. This compensation can be understood by mentally flipping one of the pumping units of FIG. 2 while keeping all fluid connections intact.

The intake pipe 16 is passed through one shaft and the exhaust pipe 18 through the other shaft.

The device is place towards the radiation A of the sun so that the upper casing 10 of the unit 22 in the lower position is facing towards the sun and the upper casing 10 of the unit 21 in the upper position is facing away from the sun. When the evaporating liquid in unit 22 now, by means of the membrane 3, presses water into the cooling space between the casings 10 and 1 in the unit 21, the evaporable liquid in the unit 21 is cooled and condensed, whereby the unit 21 comes into the suction phase. During the suction phase its weight increases when the intake space is filled with the liquid to be pumped. The arrester 27, however, prevents the unit 21 from going down until the momentum produced by its weight exceeds the momentum of the spring force 26. Then the device rotates in the direction of the arrow B and the unit 21 goes down and the unit 22 goes up and, in its turn, comes into the suction phase. By means of the rotary movement, it is achieved that the surface collecting the radiation in the unit in the cooling and suction phase is directed away from the sun and the cooling is therefore more efficient.

FIG. 8 illustrates a further alternative construction. The casing parts 1, 2, and 10 are made of corrugated sheet, casings 1 and 10 transparent. The sheets 2 and 10 are fitted against each other so that spaces divided by the membrane 3 remain between their wave tops. The sheets 1 and 10 are placed one above the other at a distance from each other so that a space 30 remains between them for the cooling water. The device is divided longitudinally into two parts and the parts are connected by means of conduits (not shown in the figure) to each other by means of a conduit system in accordance with the principle of FIG. 2. The pumping units of FIG. 8 may be connected together in pairs with the intake 16 and exhaust 18 pipes connected, respectively. These pairs of pumping units would then function in parallel. With modifications obvious to one skilled in the art the pumping units could be connected in other ways also. For example, the ten pumping units shown in FIG. 8 could be connected with a bank of five pumping units with parallel connected valves 5, 6, 14 and 15, respectively, substituted for pump unit 21 in FIG. 2 and another bank of five pumping units with parallel connected valves 5, 6, 14 and 15, respectively, substituted for pumping unit 22 in FIG. 2. The construction is highly simple to manufacture, and the size of the device may be selected in accordance with the requirement.

When a transparent upper casing 10 is used, its material must be well penetrable to the solar heat radiation. Moreover, it must be durable, and its properties of resistance to impacts, pressure, and heat as well as its chemical durability must be suitable. The manufacturing technique and the material cost also impose their requirements. Suitable casing materials are, e.g., polymethylacrylate and polycarbonate, which are transparent. The former stands sunshine very well, in the latter one brittleness and colour changes occur to some extent.

The membrane absorbing the solar radiation shall be elastic so that its form adjusts itself to changes in pressure, and it shall have a good ability to absorb radiation. Thus, the most appropriate colour of the membrane is black. Moreover, the membrane shall insulate heat so that the absorbed heat is not transferred into the water space underneath the membrane. A closed-cell structure functions well as an insulator. The material shall be chemically resistant to the liquid that is used as the evaporable substance. Moreover, it shall function as a seal so that the evaporating substance cannot penetrate through it even as vapour. Resistance to radiation is also required. One suitable membrane material is the black membrane supplied by Messrs. Ikas Oy under the name "Armaflex". The material stands temperatures of $-40°$ to +85° C. An appropriate thickness of the membrane is, e.g., 3 to 6 mm. Another suitable alternative is a 1 to 2 mm thick nitrile rubber with some heat-insulating material underneath.

As evaporable substance it is possible to use, e.g., hydrocarbons, such as pentane, hexane or heptane. Other readily evaporable liquids with appropriate chemical properties may also be used. The most important thing is that the substance has a sufficient vapour pressure at the temperatures produced by the radiation and that it, on the other hand, when it cools, condenses easily back into liquid.

The invention is not restricted to the above embodiments only, but it may show even considerable variability within the scope of the patent claims. As the surface absorbing heat it is also possible to use the inner upper casing 1, in stead of the membrane. Then, the same transparent material is not used in the casing 1 as in casing 10, but a material that absorbs the heat radiation and passes the heat through itself into the vapour space between the casing 1 and the membrane 3. An appropriate material is some metal, whereby the upper surface of the casing 1 has been treated black. Then the membrane 3 no longer has to be heat-absorbing, but it only functions as an insulation and prevents the transfer of heat from the vapour space into the water space underneath the membrane. Then it is easier to arrange the cooling of the evaporated liquid than in an embodiment in which both upper casings 1 and 10 are transparent.

An embodiment provided with a cooling space, in which two units have been joined together in accordance with FIG. 2, can also be accomplished in the way shown in FIGS. 9 to 11. In stead of a space between two casings, it is also possible to use one or several cooling pipes 30 of circular or polygonal mantle face fitted into the evaporation space 28 as the cooling space. Then it is not necessary to have two pressure-resistant upper casings, so that the construction is less expensive. In the construction in accordance with FIGS. 9 to 11, the face absorbing radiation consists of the upper part 10 of the outer casing, which is made of black metal sheet. If desired, it is possible to provide the outer casing 10 with an additional transparent outer casing, lying above the outer casing 10 (not shown in the figure), which improves the ratio of recovery of the radiation. This additional casing is, however, not necessary. In this alternative the transparent casing does not have to be pressure-resistant, so that in stead of acrylic it is also possible to use glass, whose cost is lower.

If a black metal sheet casing is used, a layer of dry vapour tends to be formed on the surface of the casing which acts as an insulation and retards the transfer of heat from the sheet to the liquid, making the operation of the pump thereby slower. In the construction in accordance with FIGS. 9 to 11, this problem has been solved by on the inside surface of the outer casing 10 fitting lamellas 31 which form troughs opening upwards between the casing and the lamella. When the vapour in the evaporation space 28 starts condensing into liquid, liquid is assembled in the troughs formed by the lamellas, where the condensed liquid is in contact with the outer casing thereby preventing the formation of an insulating vapour layer on the inside surface of the casing. As an alternative to the solution of FIG. 11, in which the cooling water pipes have been fitted onto the lamellas, the walls of the troughs can be made hollow and the cooling water may be circulated inside the trough walls.

In the construction of FIGS. 9 to 11, two lengthy components 21 and 22 with circular cross-sections have been used as pump units. In this construction the shape of the evaporation space is advantageous in view of the pressure and the vacuum, and it is possible to use relatively thin wall thicknesses, which results in low cost of the construction. The membrane itself is also subject to little strain in this construction. It is easy to select any desired magnitude of the area by just selecting units of appropriate length. Two such units are fitted into the frame 40 so that the upper parts 10 of the casings are directed towards the radiation A.

Problems may also be caused by constant heating effect of the sun, as a result of which the temperature in the evaporation space remains high and no condensation can take place. This problem, however, can be resolved by minor modifications of the pumping units. These modifications include a heat insulating wall 32 (FIGS. 12 and 13), a fluidic operated shutter 36 (FIG. 14) and a weight operated shutter 49 (FIG. 15). Other modifications would be obvious to one skilled in the art. For simplicity of illustration no valves, conduits or detail of integral construction as shown in these figures. FIGS. 12 and 13 disclose a single pumping unit similar to a single unit 21 or 22 in FIG. 2 of this application. FIGS. 14 and 15 disclose pairs of pumping units. All of these units are connected in pairs in accord with the principle of FIG. 2 (with or without water cooling.). In the construction of FIGS. 12 and 13 the high temperature problem has been solved by in the evaporation space 28 placing two heat-insulating partition walls 32. The top surface of the partition walls 32 is heat absorbing. The walls 32 are fitted at a distance from the outer casing 10 so that the lower edges of the walls join the connection point between the casings 10 and 2 and the upper edges are apart from the casings. Then, between the walls 32 and the upper outer casing 10, troughs are formed that are closed at the bottom and open at the top. The cooling pipes 30 are fitted at the opening between the walls 32 in the upper part of the evaporation space 28. When condensed the fluid is between the transparent outer casing 10 and the heat insulating wall 32, the fluid is evaporated by direct radiation and through the heat absorbing top surface of wall 32. When evaporated the fluid is in space 28—and not subject to significant radiation due to wall 32. Water running through pipes 30 cools and condenses the liquid (similar to the water between casing 10 and 1 in FIG. 2). In FIG. 12, the cooling phase has just started, whereby vapour starts condensing and the condensed liquid is assembled down on the membrane 3 and is not heated by the solar radiation. At the end of the suction phase (FIG. 13) the water that has risen into the intake space 29 presses the membrane 3 up, whereby the condensed liquid flows into the troughs between the partition walls 32 and the outer casing 10. In the troughs the radiation of the sun again starts heating the liquid, whereby it evaporates and the next phase of the pump begins.

The heating effect of the sun during the cooling phase may also be prevented by, in stead of the pivoting construction in accordance with FIGS. 4 to 7, using "sun shades" pivoting on a lever construction. In order to move the shade, it is possible to use either the pressure of the evaporating liquid or the difference in weight of full and empty pump unit.

FIG. 14 shows a solution in which the pressure of the evaporating liquid is utilized. The evaporation spaces of both pump units 21 and 22 are by means of pipes 32 connected to bellows means 34 or equivalent, between which a lever system 35 or equivalent is fitted. The lever system is additionally connected to a shade 36. In the left unit 21 the pressure phase has just ended, but the cooling has not yet started. Then, by the effect of the temperature, the vapour pressure tends to rise further. This increase in pressure can be utilized for moving the shade so that, via the conduit 33, the vapour bulges the left bellows 34, which push the end of the lever system 35 to the right in front of the bellows. By means of a suitable transmission, the other end of the lever can then be made to pull the shade 36 to the left, above the unit 21. In this way the solar radiation no longer affects the unit 21 and the vapour can be made to condense more rapidly in its evaporation space.

In FIG. 15 a solution is shown in which change in the weight of the pump is used for adjusting the position of the shade. The device comprises two pump units 21 and 22. The left unit 21 is supported from underneath by a spring 37, which lifts the empty unit to the upper position and is compressed when the unit is filled with the liquid to be pumped. Alongside the pump, an upper-position catch 38 and a lower-position catch 39 are fitted. The spring 40 presses the upper-position catch 38 to the right towards the pump, and correspondingly the spring 41 presses the lower-position catch to the right. An angular lever 43 is, by means of an articulated joint 42, pivotably fastened to the edge of the pump unit 21. The upper end of the angular lever is pivotably fastened to the shifting rod 45 by means of an articulated joint 44 fitted to the slide 46, which shifting rod can move in the horizontal position back and forth. Several shade levers 48 are pivotably fastened to the shifting rod by means of articulated joints 47, the other ends of said shade levers being by means of rigid joints fastened to the slats 49 of the shade. There is a shade on each unit, and their slats 49 are fastened to the shade levers 48 so that, when the shade above one unit is closed to solar radiation A, the other shade is open. The joint between the shade levers 48 and the shade slats 49 is, moreover, e.g. by means of a slide, arranged so that the levers 48 can pivot when the shifting rod 45 moves in the horizontal position. In the phase shown in FIG. 15, the shade of the left unit 21 is open and that of the right unit 22 closed. The left unit is just about to be emptied. When it is emptied further, its weight becomes so much lighter that the catch 39 of the lower position is released and the unit rises to the upper position, which is shown in the figure by dotted lines. When rising to the upper position, the pump unit pivots the angular lever 43 to the right, whereby the shifting rod 45 moves to the right. The upper ends of the shade levers 48 are at the same time pivoted to the right and, when the levers pivot, at the same time the slats of both shades are also pivoted. Thus, then the left shade is closed and the right shade is correspondingly opened. These positions are shown in the figure by means of dotted lines.

A highly simple and inexpensive pump can be accomplished by using one pump unit that has a metal casing as well as mere air cooling. In providing the shade it is then possible to use the principle shown in FIG. 14, or that shown in FIG. 15.

The choice of the cooling alternative depends on the circumstances and on the suction height required. The more efficiently the cooling takes place, the higher is the suction height that can be achieved.

What we claim is:

1. In a thermal pumping unit having a casing divided into two parts by an elastic membrane, one part containing a temperature sensitive evaporating-condensing fluid and the other part being a pumping space with intake and exhaust valves, the improvement of the part of the casing containing the temperature sensitive evaporating-condensing fluid being transparent to thermal radiation from the sun with the membrane having a heat absorbing surface on the side towards the transparent part of the casing such that the temperature sensitive evaporating-condensing fluid is completely subject to heat by direct and radiant sources and characterized by the addition of a cooling means, said cooling means having an input and an output, said cooling means condensing the evaporating-condensing fluid, and by the addition of a second substantially identical thermal pumping unit complete with cooling means, the exhaust valve of the first thermal pumping unit being connected to the input of said cooling means of the second thermal pumping unit and the exhaust valve of the second thermal pumping unit being connected to the input of said cooling means of the first thermal pumping unit, the matter being pumped by each unit cooling the evaporating-condensing fluid of the other unit speeding the cycling time of the thermal pumping units and substantially alternate the evaporating and condensing of their evaporating-condensing fluids.

2. The thermal pumping device of claim 1 characterized in that the intake valves of the first and second thermal pumping units are connected together to a common intake pipe and in that the output of the two cooling means are connected together to a common exhaust pipe.

3. In a thermal pumping unit having a casing divided into two parts by an elastic membrane, one part containing a temperature sensitive evaporating-condensing fluid and the other part being a pumping space with intake and exhaust valves, the improvement of the part of the casing containing the temperature sensitive evaporating-condensing fluid being transparent to the thermal radiation for direction substantially towards the sun, the membrane having a heat absorbing surface on the side facing the transparent part of the casing and by the addition of a second transparent casing part, said transparent casing part being attached to the casing between the transparent casing part and the membrane, said second transparent casing and the transparent casing forming a cooling space, and means attached to said cooling space for cooling the evaporating-condensing fluid when the fluid is substantially evaporated, the transparent casing part and heat absorbing membrane causing the evaporating-condensing fluid to be subject to direct and indirect thermal radiation and said cooling means in said cooling space speeding the cycling time of the thermal pumping unit.

4. The structure of claim 3 characterized by the addition of a second improved thermal pumping unit and wherein the means attached to said cooling space for cooling the evaporating-condensing fluid of the first thermal pumping unit is a connection to the exhaust of the pumping space of the first pumping unit and wherein the means attached to said cooling space for cooling the evaporating-condensing fluid of the second thermal pumping unit is a connection to the exhaust of the pumping space of the second pumping unit whereby the matter pumped by the first thermal pumping unit cools the evaporating-condensing fluid of the second thermal pumping unit and the matter pumped by the second thermal pumping unit cools the evaporating-condensing fluid of the first thermal pumping unit to speed the cycling times of the pumping units, respectively.

* * * * *